(12) United States Patent
Suvanto (10) Patent No.: US 11,754,141 B2
(45) Date of Patent: Sep. 12, 2023

(54) SPRING ELEMENT

(71) Applicant: Labrys Oy, Isokyrö (FI)

(72) Inventor: Samuel Suvanto, Isokyrö (FI)

(73) Assignee: Labrys Oy, Isokyro (FI)

( * ) Notice: Subject to any disclaimer, the term of this patent is extended or adjusted under 35 U.S.C. 154(b) by 348 days.

(21) Appl. No.: 17/033,825

(22) Filed: Sep. 27, 2020

(65) Prior Publication Data

US 2021/0156451 A1 May 27, 2021

(30) Foreign Application Priority Data

Nov. 25, 2019 (FI) .................................... U20190122
Sep. 7, 2020 (DE) ...................... 20 2020 003 792.3

(51) Int. Cl.
*B60R 11/02* (2006.01)
*F16F 15/073* (2006.01)
(Continued)

(52) U.S. Cl.
CPC ............ *F16F 15/073* (2013.01); *F16F 1/185* (2013.01); *F16F 1/26* (2013.01);
(Continued)

(58) Field of Classification Search
CPC .. F16F 15/073; F16F 1/185; F16F 1/26; F16F 2224/0208; F16F 2226/047;
(Continued)

(56) References Cited

U.S. PATENT DOCUMENTS 57,312 A * 8/1866 Greenwalt ................ F16F 1/26
267/53
1,156,859 A * 10/1915 Hamilton .............. F16F 15/073
267/165
(Continued)

FOREIGN PATENT DOCUMENTS

CN 100575738 C 3/2008
CN 203560351 U 10/2013
(Continued)

OTHER PUBLICATIONS

European Search Report for EP20198824 (corresponding application to subject application).

*Primary Examiner* — Christopher Garft
*Assistant Examiner* — Michael McDuffie
(74) *Attorney, Agent, or Firm* — Katterle Nupp LLC; Paul Katterle; Robert Nupp (57) ABSTRACT

A spring element that includes one or more loop portions. Each loop portion provides vibration isolation characteristics for the spring element. One or more fastening portions of the spring element enable the fastening or connecting of the spring element to one or more structures. A ratio of a longitudinal measure of each loop portion to a transverse measure of the spring element is between 7.5 and 500. A pair of loop portions may be integrally joined together at a middle section to form a continuous loop. A pair of fastening portions may be integrally joined to opposing sides of the middle section, respectively. One of the fastening portions
(Continued)

may be connected to a first structure and the other one of the fastening portions may be connected to a second structure.

19 Claims, 8 Drawing Sheets

(51) Int. Cl.
*F16F 1/18* (2006.01)
*F16F 1/26* (2006.01)

(52) U.S. Cl.
CPC . *F16F 2224/0208* (2013.01); *F16F 2226/047* (2013.01); *F16F 2228/001* (2013.01); *F16F 2230/0023* (2013.01); *F16F 2238/022* (2013.01)

(58) Field of Classification Search
CPC ......... F16F 2228/001; F16F 2230/0023; F16F 2238/022
USPC ................ 248/573, 576, 605, 606, 614, 634
See application file for complete search history.

(56) References Cited

U.S. PATENT DOCUMENTS

| | | | | |
|---|---|---|---|---|
| 1,173,850 | A * | 2/1916 | Oliver | F16F 1/26 267/43 |
| RE18,810 | E * | 5/1933 | Fawick | F16F 1/46 248/605 |
| 4,135,283 | A | 1/1979 | Kohlhage | |
| 4,942,075 | A * | 7/1990 | Hartel | F16F 1/426 428/113 |
| 5,005,909 | A * | 4/1991 | Fohl | B60R 22/28 297/472 |
| 5,082,252 | A * | 1/1992 | Miyamoto | F16F 13/18 180/312 |
| 5,398,907 | A * | 3/1995 | Kelchner | F16L 55/035 267/152 |
| 5,829,732 | A * | 11/1998 | Yamaguchi | F16F 1/377 267/141 |
| 5,947,226 | A * | 9/1999 | Bellamy | B60K 5/1291 180/902 |
| 7,249,756 | B1 * | 7/2007 | Wilke | F16F 3/08 267/152 |
| 7,461,815 | B2 * | 12/2008 | Almeras | B64C 27/001 248/556 |
| 9,360,075 | B2 | 6/2016 | Johnson et al. | |
| 9,556,920 | B1 * | 1/2017 | Knoll | F16D 3/12 |
| 10,413,080 | B2 * | 9/2019 | Bretis | A47C 27/065 |
| 10,617,898 | B2 * | 4/2020 | Poldmaa | A62B 35/04 |
| 10,767,720 | B2 * | 9/2020 | Wolf-Monheim | B32B 15/14 |
| 10,850,598 | B2 * | 12/2020 | Sandri | F16F 1/025 |
| 10,962,075 | B2 * | 3/2021 | Dubost | F16F 7/003 |
| 2016/0052384 | A1 * | 2/2016 | Edo | F16F 1/373 248/573 |
| 2020/0262563 | A1 * | 8/2020 | Dhermand | F16F 7/123 |

FOREIGN PATENT DOCUMENTS

| | | |
|---|---|---|
| CN | 205259390 U | 11/2015 |
| CN | 206145043 U | 10/2016 |
| EP | 2 202 010 A2 | 6/2010 |
| EP | 2 202 010 A3 | 1/2017 |
| EP | 3 121 472 A1 | 1/2017 |
| KR | 2010 0010230 A | 2/2010 |

* cited by examiner

SPRING ELEMENT

CROSS-REFERENCE TO RELATED APPLICATION

This patent application claims the benefit of priority under 35 U.S.C. § 119(a)-(d) to Finnish Utility Model Application No.: U20190122, filed on Nov. 25, 2019, and German Utility Model Application No.: 20 2020 003 792.3, filed on 7 Sep. 2020, both of which are incorporated herein by reference.

TECHNICAL FIELD

This disclosure relates to the structure of a spring element applied in vibration management.

BACKGROUND

Vibration management is a widely known area of mechanics. The goal in vibration management typically is the reduction of vibration of structures by means of different passive and active ways. Passive ways include, for instance, without an external energy source or control operating springs, which isolate a vibrating structure from another structure such that an undesirable vibration does not transfer between the structures. Passively operating dampers absorb energy of the vibration and thereby reduce the amplitude of the vibration. It is also possible to include a so-called passive mass damper which is a combination of a spring and a mass. The natural frequency of this combination is set to a frequency that corresponds to the problematic natural frequency of the structure, and thereby cancels vibration occurring on the natural frequency.

By means of using vibration management components it is also targeted to reduce or prevent vibration or stress influence to structures caused by different impact-like stresses. By means of vibration management, optimally, it is accomplished a structure that vibrates itself very little, causes very little vibration and noise to the surrounding domains and is very durable. Thereby the environmental impact in terms of vibration and noise are minimal, and the structure and its surrounding structures are not damaged, in the best case, at any time during its life-time.

A plurality of solutions have been developed to perform vibration management in the above-mentioned areas. There is, however, still need for a spring that is simple and economic to manufacture, and has very high performance as a vibration isolator in all directions of the vibration.

SUMMARY

The present disclosure is directed to a spring element that includes at least one loop portion for providing vibration isolation characteristics of the spring element. A fastening portion connected to the at least one loop portion for fastening or connecting the spring element to a structure. A ratio of a longitudinal measure (a) of the loop portion to a transverse measure (b) of the spring element is between 7.5 and 500.

BRIEF DESCRIPTION OF THE DRAWINGS

The features, aspects, and advantages of the present disclosure will become better understood with regard to the following description, appended claims, and accompanying drawings where:

DETAILED DESCRIPTION OF ILLUSTRATIVE EMBODIMENTS

The embodiments relate to a new spring/spring element manufactured by cutting from a plate, by cutting/perforating/forming to a plate or by casting, for instance, which spring element can be utilized in vibration isolation purposes, that is, to prevent vibration to transfer from one structure to another. The spring element according to the embodiments has a thin structure, flexes to all directions, and has a low profile. By using the spring element, it is possible to form a passive vibration isolation arrangement by placing one or more spring elements as a load carrying structure between two masses.

Possible uses of the spring element are all structures and vibrating machines in machine building industry, construction industry, vehicle industry or in any other use where it is desired to control the mechanical vibration, or it is desired to use the spring in other present or future usage applications of springs. Examples of the usage areas include process equipment, vehicles, sensitive electric devices, motors and measurement devices.

Figure 1:
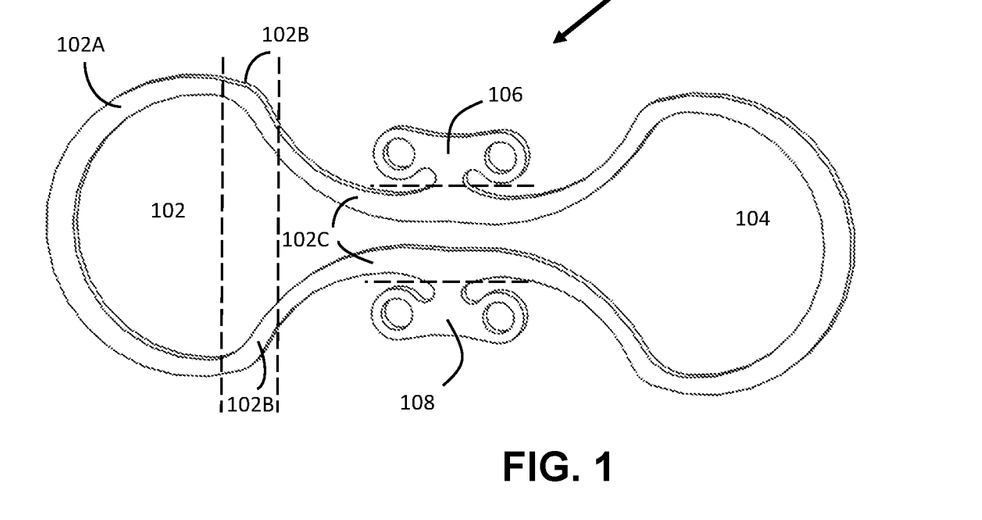
FIG. 1 shows a side view of a spring element according to an embodiment of the invention.

FIG. 1 illustrates one embodiment of a spring element 100 according to the invention. On a coarse level, the spring element of FIG. 1 can be divided into two loop sections 102 and 104, which loop sections connect in the middle of the spring such that the loop sections 102 and 104 together form a full and uniform loop. The spring element 100 comprises also a fastening portion, which may include a first fastening element 106 on a first side of the loop, and a second fastening element on the second side of the loop for fastening the spring to the target, whose vibrations are to be controlled. The spring element of FIG. 1 is preferably symmetric such that the loop sections and fastening portions are mutually symmetric with respect to the middle of the spring element. The fastening portions can, however, be implemented as asymmetric in contrast to what is shown in FIG. 1. The fastening portions can be of different type on the different sides of the spring, on one side of the spring there may be provided a portion enabling a screw connection, and on the other side of the spring there may be provided a portion enabling a welding connection.

Further specified, the loop portions can be divided into smaller portions. For example, the loop portion 102 can be divided to an end curve 102A, transition portions 102B on both sides of the end curve, and two inner curves 102B as extensions of the transition portions. The end curve refers in FIG. 1 the portion residing on the left of the left-side dashed line, the transition portions refers to the portion between the dashed lines, and the inner curve refers to the portion of the spring which extends from the dashed line on the right to the middle of the fastening element 106 of the fastening portion when seen in the longitudinal direction of the spring, that is in the direction of the x-axis in FIG. 5.

Figure 4:
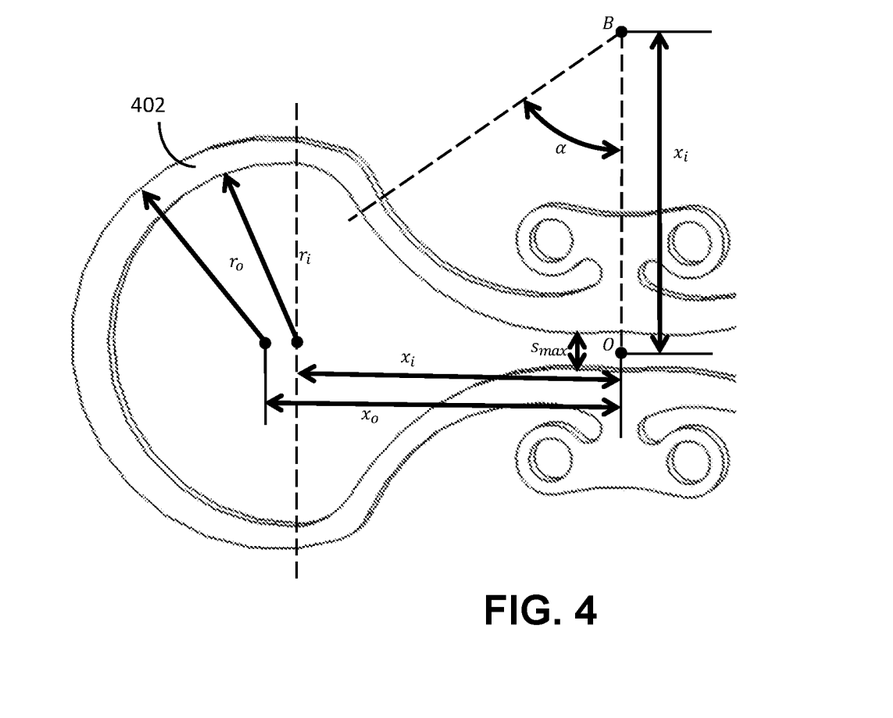
FIG. 4 also illustrates dimensioning associated with the spring element.

When applied for the purpose of vibration isolation, one fastening portion is fastened either to the vibrating device/structure or the device/structure which is aimed to be isolated from the vibration. The other fastening portion is fastened to the opposite device/structure. The spring can act as a vibration isolator in its compression direction when the device/structure fastened to the fastening portion presses the fastening portions towards each other. The greatest distance which the fastening portions can move towards each other in a compression situation is on $s_{max}$ (FIG. 4). Thereby the spring can be designed such, for instance, that it can bottom out to avoid permanent transformations of the structure. The selection of the measure is affected the mass the spring is bearing, possible external static load, the vibration amplitude, and also the stiffness and strength of the manufacturing material of the spring.

The spring can also be used in other orientations. The spring can be applied as a vibration isolator in the vertical direction also in such a way that the device/structure fastened to the fastening portions pulls the fastening portions away from each other. This orientation can be called as tension-direction orientation. Also in such a case the greatest allowable operating distance is $s_{max}$ but nothing limits the operating distance if load is increased over the sustainability limit of the spring. Thus, in such an orientation, plastic deformations can always take place in the spring if operating distance is not limited by any other limiting mechanism. However, the performance of the spring is similar as in the compression direction.

The spring operates also very well when used in transverse orientation such that one of the fastening portions is fastened to the device/structure loading the spring in a transverse direction. Then, by using the spring, values of the natural frequency may be even 30% smaller than in vertical mounting. In an overloading situation, the spring can have a plastic deformation in a similar way as in tension-direction mounting if this is not limited in any way.

The spring can also be used when loaded in its longitudinal orientation, although its performance is worse than when used in vertical orientation. Then, one of the fastening portions is fastened to the device/structure, which loads the spring in longitudinal direction. Then, about 10% higher natural frequencies can be achieved compared to situation when the spring is mounted vertically. In an overload situation, the spring can have plastic deformation in a similar manner than in tension-direction mounting if this is not limited in some manner.

Mounting direction is usually determined by the usage and needs thereof, such as use of space or some other need associated with the fastening. Static vertical load is a critical and important factor in selection of the spring and in determination of the mounting orientation. Typically, in vibration isolation, the flexing is always desired to all three directions, and it is thus an important characteristic that the spring according to embodiments flexes, independent of the mounting direction, to all three directions, and provides thus a low natural frequency in each direction, and thereby good vibration isolation capability to all three directions.

Figure 2:
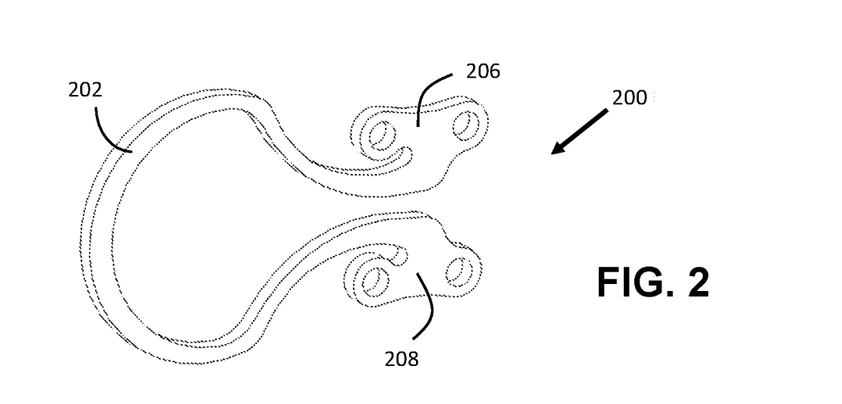
FIG. 2 shows a spring element according to another embodiment of the invention.

FIG. 2 shows another advantageous embodiment of a spring element 200. The difference to the embodiment of FIG. 1 is that in the spring element of FIG. 2 there is only one loop section 202 acting as vibration isolator. On the opposite side of the loop section the spring element is open ending to freely residing fastening portions 206 and 208, whereby the spring element as a whole does not form a uniform loop. The structure shown is especially useful in situations where the structure of FIG. 1 having two loop portions is not applicable due to space reasons, for instance.

The drawings illustrate dimensions associated with the spring element and it is obvious that the dimensioning principles are applicable to spring elements having one or two loop sections.

Figure 3:
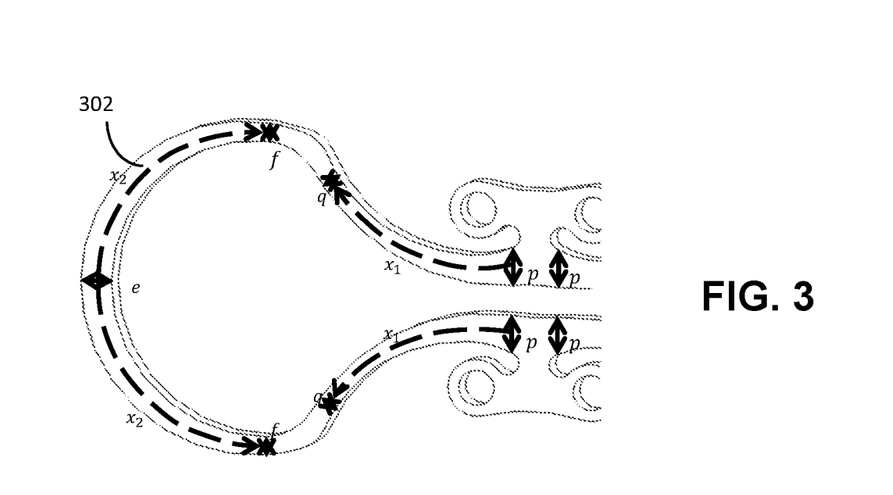
FIG. 3 illustrates dimensioning associated with the spring element.

FIG. 3 illustrates preferred dimensions and relations of different portions of the loop sections. Preferably the end curves, such as the end curve 302 have been formed such that it comprises an at least partly converging portion when moving from the middle of the end curve towards the ends of the end curve. In one embodiment, the profile is convergent on the whole length of the end curve, whereby the widest point of the profile, when observed from a side, can be in the middle of the end curve, which has been depicted with letter e in FIG. 3. Correspondingly, the smallest width of the profile of the end curve can be at the ends of the end curve depicted with letters f in FIG. 2. This convergent form ensures an even stress distribution in a large portion of the end curve. Due to the even stress distribution, stiffness of the spring in relation to the ability to carry load becomes lower, whereby lower natural frequency values for the spring-mass system can be achieved in vibration isolation use. In other words, the performance of the spring improves.

Preferably the largest profile width e and the smallest profile width f are related to each other such that e/f= 1.6 . . . 4. The width of the profile can change on the distance $x_2$ depicted by dashed lines such that it decreases substantially parabolically, that is to second power as a function of the distance. The shown form is preferred as the spring has sufficient mechanical strength at the end of the end curve but by making the spring thinner can spring properties be significantly improved. Even more preferably, the mentioned ratio is between e/f=1.6 . . . 3 or even more preferably e/f=1.6 . . . 1.8 when the length of the spring decreases. The ratio e/f=1.6 . . . 1.8 can become to question, for instance, in a situation when the length of the spring has at least substantially dimensions as shown in FIG. 1 and can be positioned to a longitudinally compact space.

The greatest width p and the smallest width q of the inner curves of the spring are related to each other such that p/q=2 . . . 5. The width of the profile changes during the distance $x_1$ illustrated by dashed line such the width decreases substantially quadratically, that is to second power as a function of the distance. This form is advantageous in order to achieve sufficient mechanical strength at the end of the fastening portion still ensuring good spring properties at the other end of the inner curve. Even more preferably the mentioned ratio is between p/q=2 . . . 2.5 the spring height being lower. The ratio p/q=2 . . . 2.5 may be applicable in an embodiment corresponding to dimensions shown in FIG. 1, whereby the spring can be placed into a compact space in height direction.

Form of the transition portions can vary from those illustrated in FIG. 3. Preferably the concave inner side of the area has been rounded to smooth whereby the convex outer side of the spring can have different forms. Preferably, however, the width of the transition portion is, in the whole transition portion, higher or equal to the measures f and q of the ends of the transition portion.

FIG. 4 illustrates form and measures of one embodiment of the spring element. As can be seen, the inner edge of the end curve is formed of a circle segment having a radius $r_i$. The end curve can be defined to be formed of a segment that is determined by a line drawn via the center point of said radius when the spring is positioned horizontally, that is the longitudinal direction of the spring is in horizontal plane.

When the spring element is positioned as mentioned above, the inner curve can be defined by first drawing a vertical dashed line travelling via the center of the fastening portion. To this line two points are placed. The first point O is placed to the level of the mass center of the end curve of the spring. The second point B is placed above point O to a distance $x_i$, which is the same distance as the distance of the center point of the inner edge of the curve from point O. Then a new dashed line is drawn via point B such that an angle is formed between the segment OB and the new line, which angle is substantially α=55° as shown in FIG. 4. The new line, when intersecting the inner curve points the location where the inner curve ends and where the smallest width q of the inner curve, that is depicted in FIG. 3, resides. The, in FIG. 3 shown, greatest width p of the inner curve resides just before the point where the outer edge line of the inner curve begins to curve more steeply towards the fastening portion. This more steeply arching portion is always present in the structure apart of the design of the actual fastening portion. The fastening portion can thus be considered to be that portion of the spring element which follows after this steepened rounding outside the spring area.

Correspondingly, the outer curve of the end curve of the spring element is formed as a circle segment defined by the radius $r_o$. As can be seen, the starting points of the radiuses $r_o$ ja $r_i$, and thus the center points of circle segments defining the outer curve and inner curve do not reside in the same point, which leads to height variation of the spring profile at the area of the end curve.

Even though FIG. 4 shows one way to implement variation of the profile height at the area of the end curves, the embodiments are not limited to the shown way but the variation can also be implemented in alternative ways.

Above has been disclosed the variation of the profile height at the area of the end curve but also the inner curves can include similar areas where the profile height varies similarly as in the case of the end curves.

Figure 5:
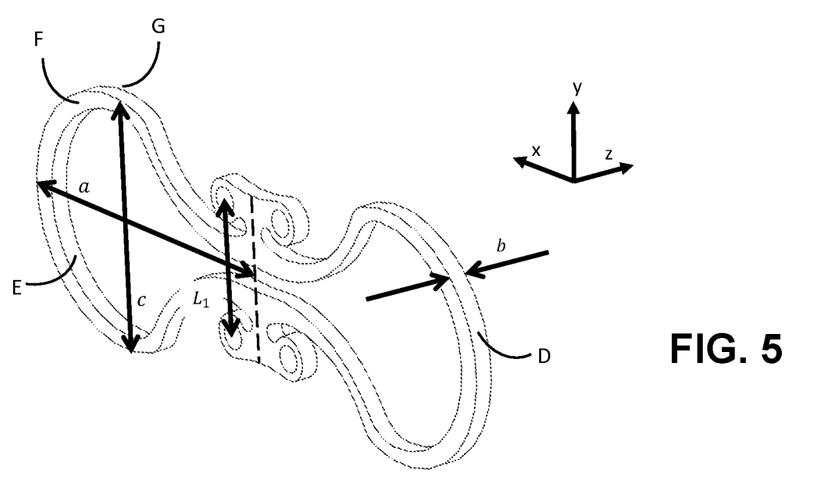
FIG. 5 further illustrates dimensioning associated with the spring element according to the embodiments.

FIG. 5 further illustrates dimensioning of the spring element. The spring element has been placed into a coordinate system, where the x-axis points to the longitudinal direction of the spring, y-axis to height direction of the spring and z-axis to the transverse direction of the spring.

In the transverse direction the distance from one side to the other side of the spring is thus b. Preferably the spring is manufactured by cutting from a plate whereby the transverse dimension b is determined by the thickness of the plate. In this direction the dimension is thus limited by the cutting process, whereby the dimension can practically vary between b=0.5 mm . . . 200 mm.

The longitudinal dimension (x-axis) of the spring a, that is the length of the loop section, is defined as the distance from the outer edge of the end curve to the center of the spring (point O in FIG. 3), and the dimension is preferably as great as possible to achieve as low stiffness as possible. In preferred embodiments of the invention the ratio between a and b is between a/b=7.5 . . . 500.

The lower limit 7.5 of the mentioned value range is advantageous because if the ratio would be smaller then manufacturing by cutting from a plate would be difficult. Furthermore, if the ratio would be smaller than 7.5 also the transverse stiffness increases whereby the performance of the spring to that direction for vibration isolation purposes would deteriorate.

If the applied ratio value a/b is too big, the springs have to preferably be used as coupled to each other as otherwise the spring structure is not stabile but there is a risk for buckling when the spring is loaded. The upper value 500 of the value range is advantageous because in such cases the spring can still be applied as presented above comprising one or two loop sections and fastening portions connected to those. If a value higher than 500 is used, the above shown structure is no longer applicable but the springs need to be fastened to each other also from other areas in addition to the fastening portions. This is due to the fact that if other portions of the spring than the fastening portion can slide in height and longitudinal directions with respect to other springs, it can occur that the spring can buckle independent of how many springs are used in the assembly. The root cause for this is that a laminar structure is less stiff when bent compared to a homogenic structure.

Above has been disclosed that the preferred value range a/b is between 7.5 . . . 500, but even more preferably the mentioned ratio is between 10 . . . 150 when the transverse stiffness of the spring is always sufficiently low in order to provide high performance also in transverse direction. When the value is closer to value 10, a single spring can be used to form a vibration isolator. Thereby the spring is still with this value possible and easy to manufacture by cutting from a plate. On the other hand, when the value is close to 150, is the vibration isolator typically formed of several springs and this assembly is not sensitive for losing stability.

Even more preferably, and most preferably, the ratio between the longitudinal measure of the loop portion and the thickness of the spring is between 15 . . . 30 when the vibration isolator can be made of one spring without assembly. Then the stiffness of the spring to all directions is low and performance to all directions is good. A single spring is also not sensitive to loss of stability or buckling in the whole value range. The measure c to height direction (y-axis), that is the distance between the end points of the end curves on the outer edge of the spring is preferably such that the ratio a/c=1.25 . . . 4.

The distance $L_1$ between the fastening points or other fastening areas is preferably as small as possible. The ratio between that measure to the measure b is $L_1/b=6\ldots100$.

The spring element according to the embodiments is preferably manufactured, as a whole, by only using one material or material alloy. Preferably the spring element is manufactured from metal materials such as steel, titanium or aluminum. The embodiments are not, however, limited to that the spring is manufactured from steel, but the spring element can also be manufactured from elastomer materials, such as polyamide, polyethylene, ABS, polycarbonate, polypropylene or reinforced plastic such as fiber glass or carbon fiber.

When the material behaves in its elastic performance area linearly, the optimal predictability for performance is achieved. Thereby also the force—displacement relation of the spring stays linear within the whole application area, which makes it easier to predict the behavior and dimensioning of the vibration isolation system. When the properties of the material stay substantially constant in the whole temperature range of use, this allows to achieve the best predictability.

The surfaces of the spring can be classified to two different finish classes of the surface, which are formed in manufacture. Referring to FIG. 5, the surface D, which refers to the continuous outer surface of the spring including curved portions, and surface E, which is the inner surface of the spring containing curved portions, the surface finish on those surfaces is modest. The surface finish can correspond, e.g. to surface finish obtained in thermic cutting or water cutting. The surface F, which is a straight surface such that a surface normal positioned to any point on the surface always points to the same direction in the limits of the manufacturing tolerance, and also the alike surface G on the opposite side of the spring, have a more precise surface finish requirement. The surface finish can correspond to rolling surface of a steel plate obtained by hot rolling or cold rolling. Then it is possible to use surfaces F and G as fastening surfaces for screw attachments.

Figure 6:
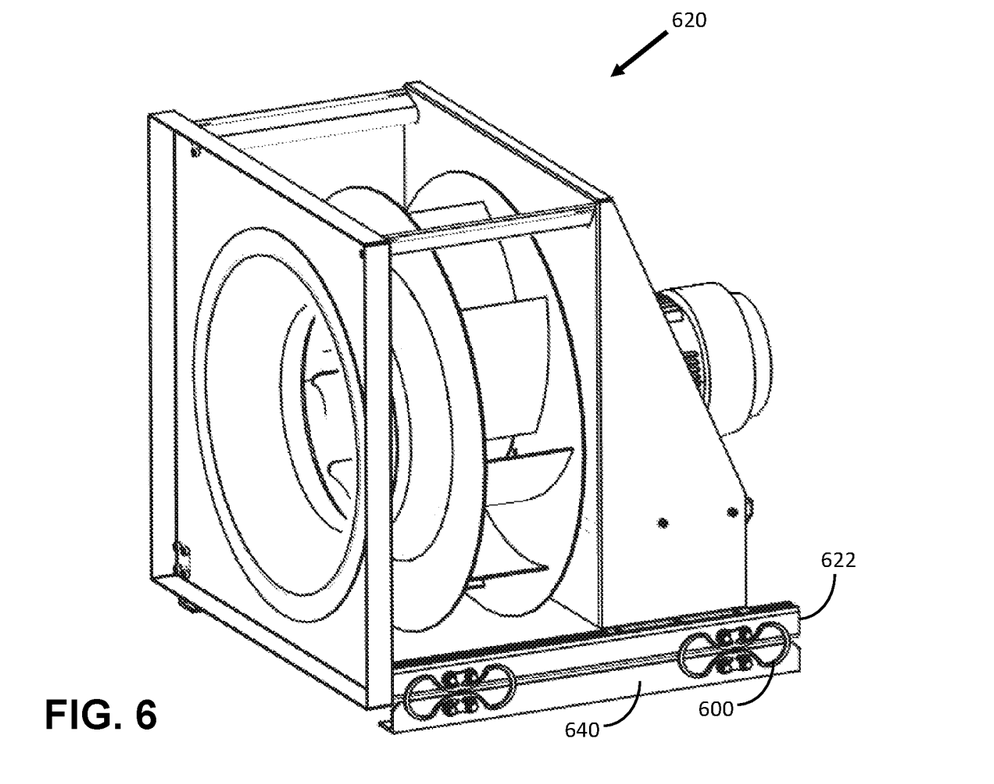
FIG. 6 illustrates one embodiment of the use of the spring element as a vibration isolator.

FIG. 6 illustrates one exemplary usage target of the spring element according to the embodiments. FIG. 6 shows a fan 620 whose vibration behavior is about to be controlled. The fan includes a fastening rail 622 by which the fan is fastened to a base structure 640 arranged on a floor or similar. Instead of the fan being directly fastened to the base structure, the fastening has been done by the vibration isolators 600 according to embodiments. The vibration isolators 600 have been fastened from their fastening portions both the fastening rail 622 of the fan, and also the base structure 640 of the floor, whereby the fastening rail stays at a distance from the base structure, which distance is defined by the spring element. By the shown assembly the springs form vibration isolation between the fan and fastening rails, whereby the fastening rails can be fastened to the floor or other base structure such that the vibration induced by the fan does not significantly transfer to this fastening structure.

Even though FIG. 6 shows the fastening portions as mutually similar, they can in this and other embodiments be implemented differently, such as one being a screw fastening and the other one as a welding connection.

Furthermore, even though FIG. 6 shows the upper structure 622, lower structure 640 and spring forming a fully integrated structure, the spring could alternatively be form as a part of one of the structures 622 or 640. In the situation of FIG. 6, for instance, this would mean that the spring could be cut into the upper structure 622 when it is being cut without the lower structure 640. The lower structure could be manufactured as a separate structure such that there are provided spaces for the lower halves of the loop sections of the spring and also holes or other fastening means for fastening of the spring.

Figure 7:
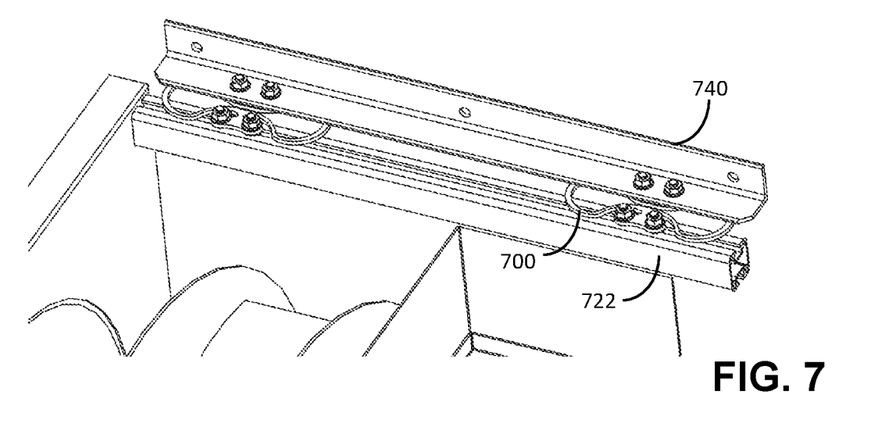
FIG. 7 illustrates another embodiment of the use of the spring element as a vibration isolator.

FIG. 7 shows an embodiment where the vibration isolation has been arranged to happen in the transverse, that is, z-direction as shown in FIG. 5. Then the fastening rail 722 belonging to the structure and a separate base structure 740 reside in different planes in transverse direction of the spring but it is clear that the embodiments are not restricted thereto but the fastening can as well be done to objects residing in the same plane.

Figure 8:
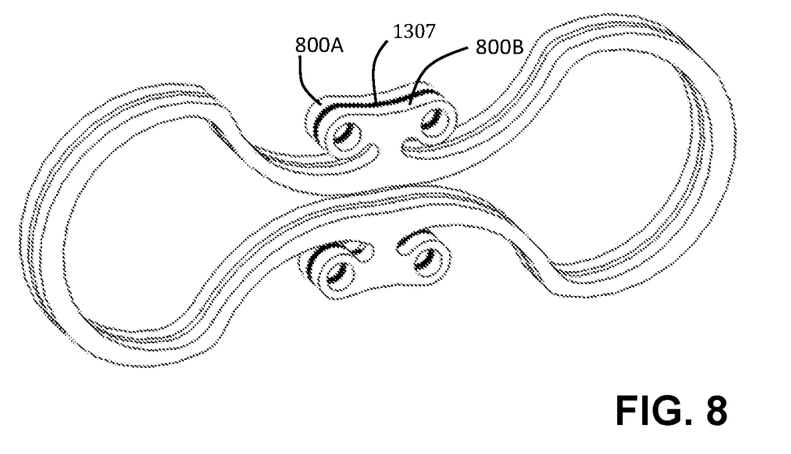
FIG. 8 illustrates use of two spring elements together to form a vibration isolator.

FIG. 8 shows one embodiment of use of the spring element according to the embodiments such that the vibration isolator is formed of two or more springs by connecting the springs side-to-side such that springs (one pair or several pairs) are separated by using intermediate plates or other structures. In this way a kind of laminar structure is formed. One example of such structure is illustrated in FIG. 8 where the spring elements 800A and 800B have been separated from each other with the intermediate plate 850. The intermediate plate is preferably of the same material as the spring such as steel but can also be of a different material. Preferably the intermediate plate is arranged only to the area of the fastening portion.

By combining several springs, it is possible to assemble a bigger vibration isolator that flexes to all directions. In such an assembly there can be two or more springs, such as in FIG. 9 the vibration isolation assembly has been formed by using eight springs.

Figure 9:
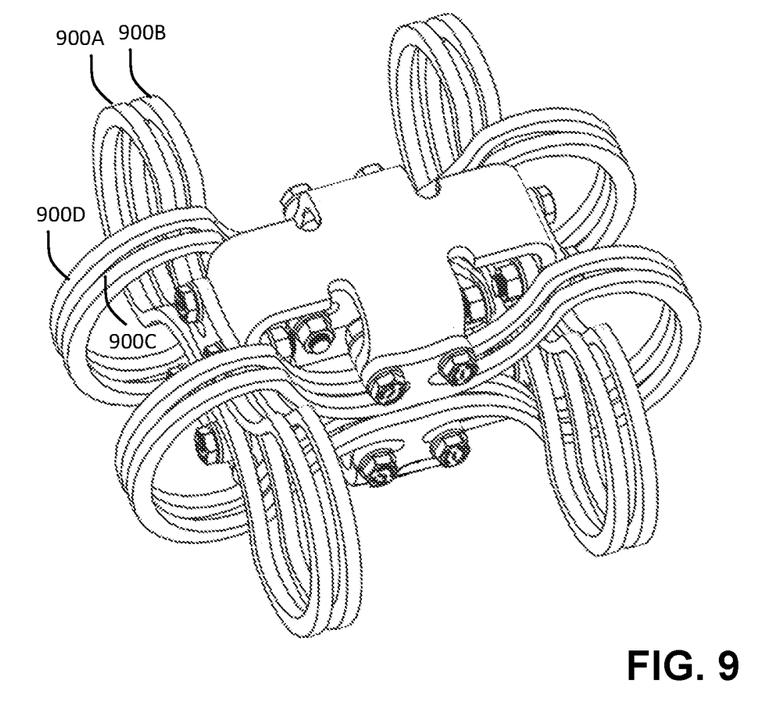
FIG. 9 illustrates use of several spring elements together in order to form a vibration isolator.

A vibration isolator flexing to all directions can be formed by using two springs, for instance, such that the springs are set perpendicular to each other whereby the longitudinal direction of one spring coincides with the transverse direction of the other spring. As FIG. 9 shows, the springs can be arranged such that the fastening area/transition portion/inner curve sets inside of the spring loop of the perpendicularly residing, and for instance the adjacent pair of springs 900A, 900B is arranged in this way with respect to the pair of springs 900C, 900D.

Figure 10:
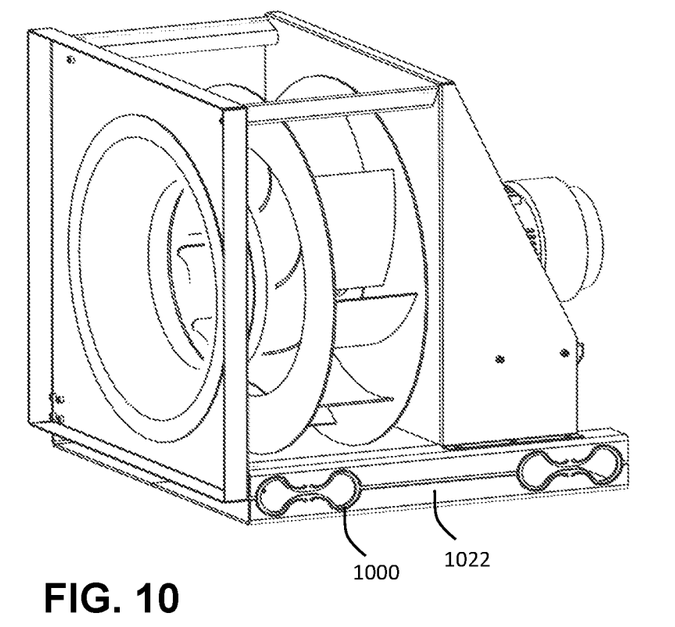
FIG. 10 illustrates integration of a spring element as a part of a plate structure.

FIG. 10 shows an embodiment where the spring 1000 is fully integrated to the frame or base structure 1022 of the device in the same manufacturing process when the frame or base structure is manufactured. This is an advantageous embodiment as often the devices nowadays are manufactured from plates and integration can be a very relevant option in many devices. Thereby, by cutting the spring form directly to the product during its manufacturing, acquiring of separate springs and fastening of them to the structures can be completely avoided. The embodiments allow manufacturing of also a variation where only one fastening portion is integrated to be part of the device structure and the other fastening portion is designed for considering some other way of fastening, such as fastening by means of screw fastening or by welding.

Figure 11A:
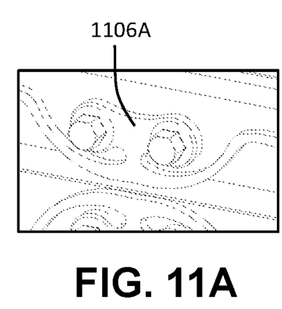
FIG. 11A shows a close-up perspective view of a portion of a first embodiment of a fastening portion of a spring element, wherein the first embodiment of the fastening portion is connected by screws to a structure.
Figure 11B:
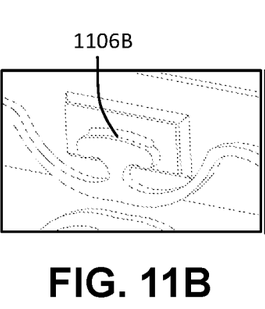
FIG. 11B shows a close-up perspective view of a portion of a second embodiment of a fastening portion of a spring element, wherein the second embodiment of the fastening portion is welded to a structure.
Figure 11C:
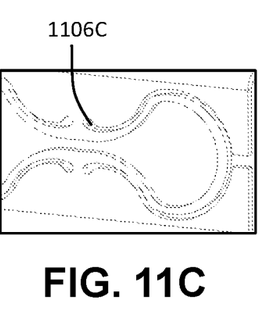
FIG. 11C shows a close-up perspective view of a portion of a third embodiment of a fastening portion of a spring element, wherein the third embodiment of the fastening portion is integrated into a structure.

FIGS. 11A to 11C illustrate some embodiments of the fastening portions. FIG. 11A corresponds, from its fastening portion 1106 the structure shown in FIG. 1 where the fastening portion includes one or more through holes passing through the spring for screw connection, for instance. FIG. 11B shows a fastening member 1106B which is welded to the structure. FIG. 11C illustrates a structure where the spring has been integrated to the surrounding structure, that is formed to be a part of a plate, for instance, as shown in FIG. 10. The fastening portion 1106C shows one possible design for such fastening portion.

The form of the fastening portion can vary depending on the application and the way of fastening, and the invention is not limited to how the fastening portions are implemented.

In some embodiments, there may be provided a limiting arrangement arranged in connection of or in proximity of the spring element for limiting the flexing and compression and bending of the spring element in all three mutually perpendicular degrees of freedom beyond respective predetermined limits. Such a limiting arrangement is preferable for use in applications which may be subject to an earthquake, for instance. An earthquake might induce such a great vibration impact to the structure that the spring could damage. The limiting arrangements are configured to limit the load to the springs to such a level that the tension does not exceed the yield limit of the spring and the properties of the spring can sustain the earthquake. The limiting arrangement is configured to mechanically prevent the mutual movement of the fastening portions of the spring element in all three coordinate directions.

In addition to earthquake situations, the limiting arrangement may be advantageous and applicable in vehicles, where a collision or an accident situation could cause overloading or ripping of the spring element or the respective fastenings.

The limiting arrangement can be dimensioned to sustain loads that are, for instance, 10-fold to the loads normally allowed by the spring element.

Figure 12A:
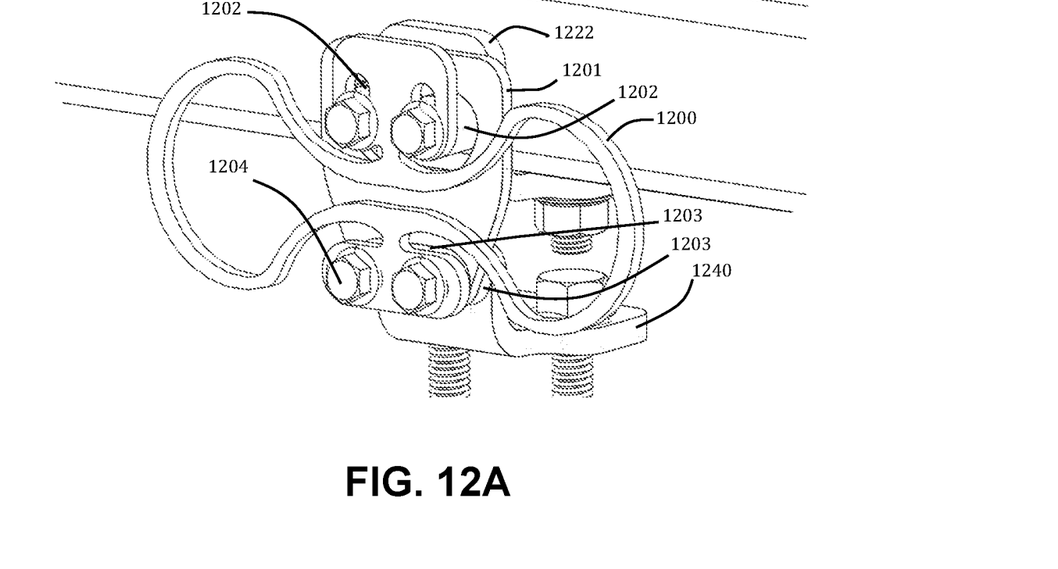
FIG. 12A shows one embodiment of a limiter arrangement.
Figure 12B:
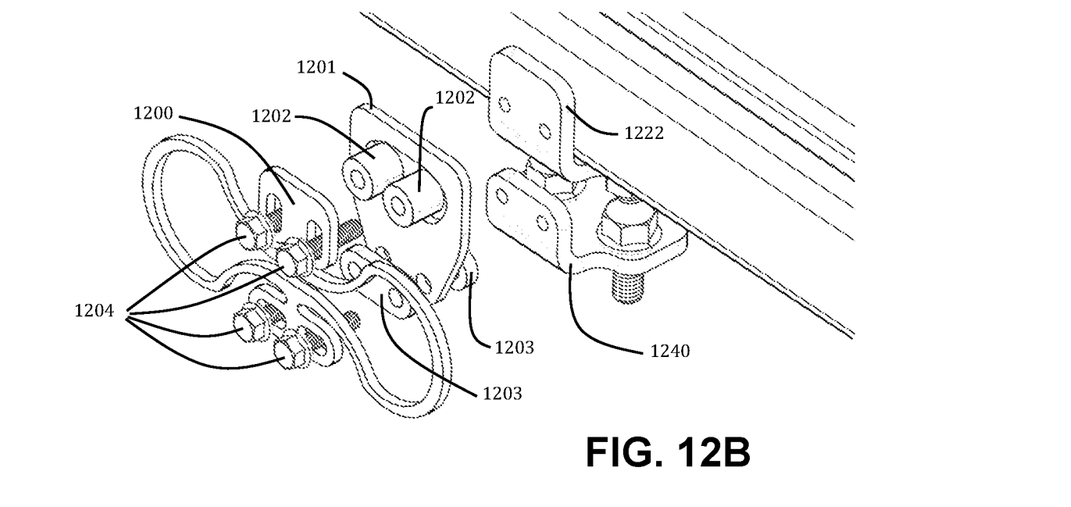
FIG. 12B shows another view of the limiter arrangement of FIG. 12A.

FIGS. 12A and 12B show an embodiment of a limiting arrangement. There are shown a first base structure 1222 attached to a vibrating structure and a base structure 1240 attached to a rigid structure. The spring element 1200 is arranged between the structures such that the base structures do not touch each other, and the spring element 1200 defines the distance between them. The actual limiting arrangement is formed by the limiting plate 1201, the limiting sleeves 1202 and the adjustment plates 1203.

The spring element 1200 has fastening portions with apertures to which fastening members 1204, such as bolts or screws have been inserted. Between the spring element 1200 and the structures whose mutual movement is to be attenuated is arranged a first limiting plate 1201 for limiting the flexing/compression of the spring in longitudinal and height direction. The limiting plate 1201 is attached to the fixed based structure 1240 and is thus basically stationary.

The plate 1201 has also a larger opening for receiving the sleeves 1202 that receive the fastening members 1204 for fastening to the moving/vibrating base structure 1222. As shown in the drawings, there is a certain clearance between the sleeves and the edges of the larger opening whereby the sleeves 1202 can move in the opening in vertical height direction and in horizontal length direction of the spring. If the movement of the structures with respect to each other exceeds a predetermined greatest allowable distance, one of the sleeves 1202 hits the edge of the opening in the limiting plate 1201 thereby preventing the damage of the spring element.

Even though FIGS. 12A and 12B show two fastening members on upper and lower sides of the spring, there may be other number of such fastening members ranging from one to three, for instance. Furthermore, even though FIGS. 12A and 12B show base plates 1222, 1240, use of those is not obligatory, but the fastening members 1240 could alternatively attach directly to the respective structures.

Figure 13:
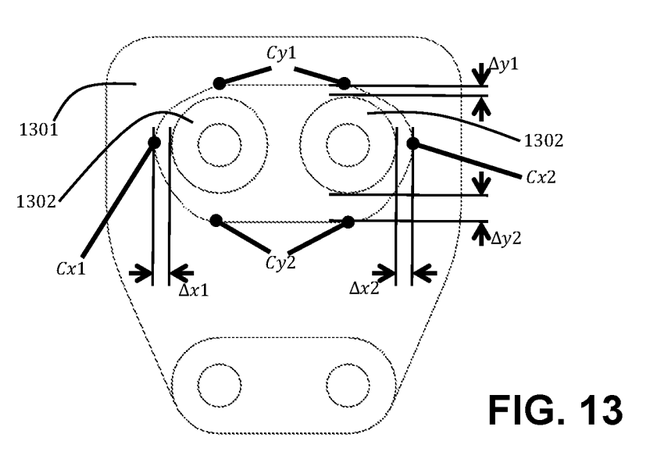
FIG. 13 highlights dimensioning in the limiter arrangement.

FIG. 13 highlights dimensioning between the openings and the sleeves 1302 in the limiting plate 1301. With regard to longitudinal movement, there is set a predetermined distance $\Delta x1$ when the movable structure moves to the left, and a predetermined distance $\Delta x2$ when the movable structure moves to the right. In height direction, the respective distances are $\Delta y1$ upwards and $\Delta y2$ downwards. These dimensions can be selected independently from each other so that e.g. the allowable dimensions in height direction can differ from each other.

Preferably the dimensions are in ranges $\Delta x1=0.35b \ldots 2b$ and $\Delta x2=0.35b \ldots 2b$ and $\Delta y1=0.6b \ldots 3.4b$ and $\Delta y2=0.6b \ldots 3.4b$. The predetermined dimensions are implemented by the form of the aperture and also by design of the sleeves 1302. Above has been discussed only the movement along the coordinate directions (x- and y-axis) but if there is movement to both these directions at the same time, this is similarly taken into account in form of the opening in the limiting plate and/or in the form of the sleeves 1302.

Even though the sleeves have shown to have a circular cross-section, the outer edge of the sleeve 1302 can alternatively be square, rectangular, triangle or polygon. If the form of sleeve differs from circular, this needs to be taken into account in defining the clearances between the sleeve and the opening. Furthermore, the number of sleeves is not limited to two but there can be e.g. 1, 3 or 4 of them.

Figure 14A:
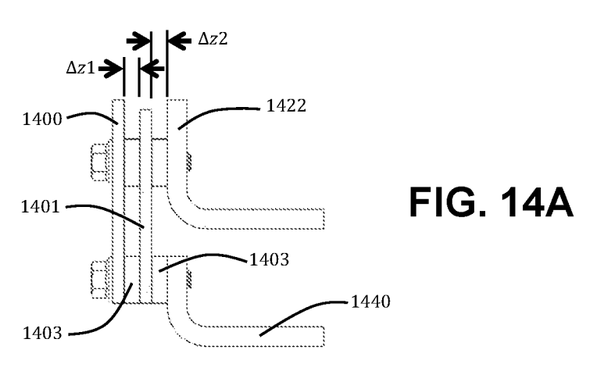
FIG. 14A shows a side view of a limiter arrangement.
Figure 14B:
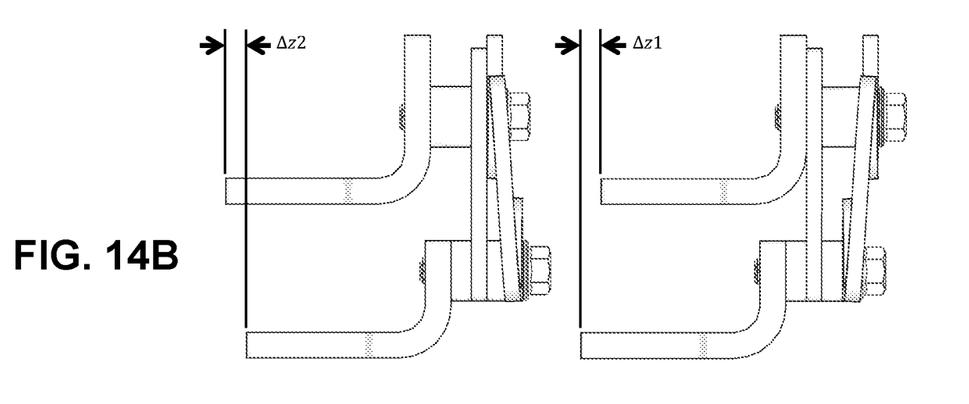
FIG. 14B shows the limiter arrangement of FIG. 14A in two different usage positions.

In transverse direction (z-direction), the movement/displacement/bending limitation is done differently than in longitudinal and height direction, which is illustrated by reference to FIGS. 14A to 14C. When the movable structure 1422 moves transversely along the z-axis, also the upper fastening portion of the spring element moves accordingly. The limiting plate 1401 can accordingly move between the structures 1400 and 1422.

At the lower end of the limiting structure, however, there is an adjustment plate 1403 between the limiting plate 1401 and the rigid structure 1440 and also similarly between the plate 1401 and the spring 1400. The adjustment plates prevent moving of the lower end of the spring element in transverse direction with respect to the rigid structure.

Thereby can the movable structure 1422 move only distance $\Delta z2$ to the left before the movable structure 1422 collides the limiting plate 1401. And the movable structure 1422 can move only distance $\Delta z1$ to the right before the vibration element 1400 collides the limiting plate 1401.

Adjustment of the magnitude of the transverse displacement can be effected by appropriate selection of the thicknesses $\Delta z1$ and $\Delta z2$ of the adjustment plates 1403. Preferably the thicknesses are such that $\Delta z1=0.75b \ldots 4.4b$ and $\Delta z2=0.75b \ldots 4.4b$. The two thicknesses can be independent of each other and thus also different from each other. Practically it needs to be ensured that the colliding surfaces in the vibration element, moving structure and the limiting plate are great enough to sustain the stress of the collision.

If it is aimed that different components of the limiting arrangement would collide gently with each other, e.g. to avoid damages to surfaces, in one embodiment to provide rubber or similar elastic material around the larger hole of the limiting plate. Furthermore, in an embodiment, the sleeves can be made of elastic material or can at least have an elastic surface treatment. In one embodiment, the sleeve comprises an additional collision surface at the end of the sleeve having a greater cross-section than that of the sleeve to provide sufficient collision area.

Figure 15A:
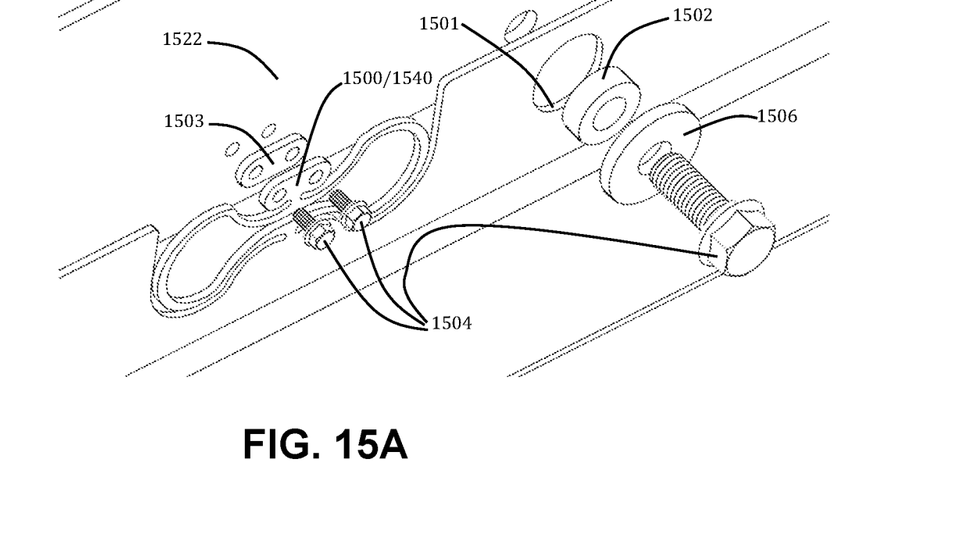
FIG. 15A shows a partly integrated limiter arrangement.

FIG. 15A shows another embodiment of a limiting arrangement. In this embodiment, the spring element 1500 is formed integrally as part of one structure (movable or rigid) and the limiter is arranged separately from the spring element. In this embodiment, the spring element is manufactured as an integral part of the first structure 1540. Thereby the fastening or connecting portion of the spring can be considered to constitute the area of the spring that is in contact with the first structure.

The second fastening portion of the spring is fastened to the movable structure 1522 by means of screws/bolts 1504. There is a single adjustment plate 1503 defining the distance between rigid and movable structures. In longitudinal and height direction, the limiting functionality is provided by means of an aperture 1501 in the structure 1540 and the sleeve 1502. The sleeve 1502 has smaller diameter than the hole 1501 whereby the hole sets limits for the sleeve to move therein. In transverse direction the displacement is limited on the other hand by the structures colliding to each other, and on the other hand the first structure 1540 colliding to a separate counter plate 1506.

Figure 15B:
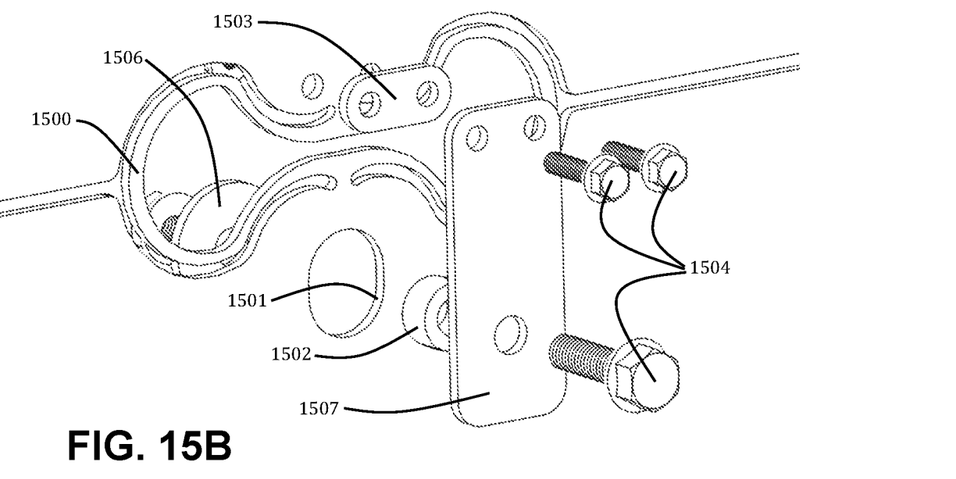
FIG. 15B shows a fully integrated limiter arrangement.

FIG. 15B shows a spring element 1500 which is fully integrated to the plate structure, and in connection to which is arranged a movement/displacement/flexing limiter configured to perform limitation to all directions. The x- and y-directions limiter mechanism provided by components 1501 and 1502 is similar as in FIG. 15A. In FIG. 15B the limiter is arranged below the spring in height direction. Also here is provided an adjustment plate 1503 that sets the maximal displacement between the structures. There is provided a counter plate that prevents the structures to displace from each other more than the thickness of plate 1503. As can be seen, similar mechanism is arranged on the other side of the spring, that is there are provided also components 1503 and 1507 to prevent transverse movement to the opposite direction.

In the embodiments there is provided a limiter arrangement for protecting a spring element arranged to attenuate vibrations between two structures that move and/or vibrate with respect to each other. The limiter arrangement is configured to limit the movement of the two structures below predetermined safety limits so that the spring element is not flexed/compressed/twisted beyond sustainable limits. The limiter arrangement is configured to operate in all three coordinate directions.

The x- and y-axis displacement limitation is based on the limiter arrangement having a fixed first connection to one of the structures and a movable connection to the second structure. The movable connection comprises an aperture wherein a sleeve is allowed to move such that the edges of the aperture define the space wherein the sleeve can move. The limiting arrangement is operatively connected to the spring. In some embodiments, the spring element and limiting arrangement even use same bolts or screws for fastening to the structures. In other embodiments, the limiting mechanism is a side of the spring, that is, it can be on the side of the spring, or below or top of it.

For transverse z-axis limitation one of the fastening portions is movable with respect to the other fastening portion of the spring. One of the fastening portions is fixed, and the other one can move in transverse direction on both sides of the fixed fastening portion.

The limiting arrangement is applicable in situations where the spring element is a standalone product attachable to the structures. It is also applicable in half-integrated solutions when one fastening/connecting portions is integrated to one of the structures and one is separately fastened by means of bolts/screws. The embodiments are also applicable in fully integrated solutions where the vibrating structures share a plate and the spring is manufactured therein.

In an embodiment, there is provided a spring structure, which comprises a spring element as depicted herein, which spring structure comprises a limiting arrangement for limiting the flexing and compressing and bending of the spring element beyond predetermined limits when connected to a first structure and a second structure. Flexing and compressing refer here to operation of the spring element in x- and y-directions and bending happens in transverse direction.

In an embodiment there is provided spring structure for limiting displacement of the structures in longitudinal and height direction of the spring element, the limiting arrangement comprises a rigid fastening to one of the structures whose movement with respect to each other is to be attenuated, the limiting arrangement further comprising a sleeve-aperture arrangement, wherein the diameter of the sleeve is smaller than the aperture, the sleeve is allowed to move within the aperture such that the collision points between the sleeve and aperture define the limits for the structure movements and thereby limits for spring element flexing or compressing. The sleeve-aperture arrangement can be provided in a separate limiting plate, which can be of uniform thickness. The limiting plate can be mounted parallel to the mounting direction of the spring element. In another embodiment, there is a separate spring element and the sleeve-aperture arrangement is arranged aside of the mounting of the spring element. In still another embodiment, the spring element is half- or fully integrated to the structure when the sleeve-aperture arrangement is also arranged to the structure.

In an embodiment, there is provided a spring structure wherein the limiting arrangement comprises a limiting plate, which limiting plate comprises one or more first apertures for receiving a first fastening member for fastening a spring element rigidly to a first structure, the limiting plate further comprising one or more second apertures for receiving a second fastening member for fastening the spring element to a second structure, there being provided a sleeve around the fastening member, the sleeve having a smaller cross-section than the second aperture.

In an embodiment, there is provided a spring structure wherein the limiting arrangement comprises, for limiting transverse bending of the spring element, a fixed fastening to at least one of the structures, and two limiting surfaces for limiting the movement of the structures in transverse direction. The limiting surfaces can be the structure and/or the spring element of FIG. 14A between which the limiting plate can move. The limiting surfaces can also be the plates 1506, 1507 of FIG. 15B.

In an embodiment, there is provided a spring structure wherein the limiting characteristics of the limiting arrangement are selectable by selecting one or more of the following: form of a sleeve 1202, diameter of a sleeve 1202, diameter of aperture 1501 defining movement limits of the sleeve, design of aperture 1501 defining movement limits of the sleeve, thickness of plate 1203, 1403, 1503 applied between a spring element and a limiting plate 1201 or between a limiting plate 1201 and a structure 1240 or between a spring element 1500 and a structure 1522 or between a structure and a counter plate 1507. Thereby the adjustment of the limiting characteristics can be selected e.g. based on the characteristics of the spring or based on the usage environment.

It is clear that when the technology develops the inventive idea can be implemented in various ways. The invention and its embodiments are thus not limited to disclosed embodiments but can vary within the appended claims.

What is claimed is:

1. A spring element, comprising: at least one loop portion for providing vibration isolation characteristics of the spring element, the loop portion having an end curve with an inner surface in the shape of an arc of an inner circle and an outer surface in the shape of an arc of an outer circle, wherein center points of the inner and outer circles are located at different points, thereby giving the end curve a varying height profile, and a fastening portion for fastening or connecting the spring element to a structure and being connected to the loop portion, wherein a ratio of a longitudinal measure (a) of the loop portion to a transverse measure (b) of the spring element is between 7.5 and 500.

2. The spring element according to claim 1, wherein a ratio of the longitudinal measure (a) of the loop portion of the spring element to a measure (c) in a height-direction of the loop section is between 1.25 and 4.

3. The spring element according to claim 1, wherein a ratio of a greatest width (e) to a smallest width (f) of a profile of the end curve of the loop portion is between 1.6 and 4.

4. The spring element according to claim 1, wherein the spring element comprises a pair of loop portions connected to a pair of fastening portions, respectively, and wherein the loop portions are arranged symmetrically on both sides of a fastening area comprising the fastening portions.

5. A spring element according to claim 1, wherein the spring element has been manufactured as a whole of one material or material mixture.

6. A spring structure, wherein the spring structure comprises at least two of the spring element of claim 1, wherein the spring structure comprises an intermediate plate between the two said spring elements to keep them separated from each other.

7. A spring structure, wherein the spring structure comprises at least two of the spring element of claim 1, wherein the spring elements are positioned transverse to each other such that the longitudinal direction of one of the spring elements is in a transverse direction to the longitudinal direction of the other one of the spring elements, and wherein surfaces defining the thicknesses of the spring elements are at least substantially parallel to each other.

8. A spring structure, comprising: a spring element according to claim 1 and a limiting arrangement for limiting the flexing and compressing and bending of the spring element beyond predetermined limits when connected to a first structure and a second structure.

9. The spring structure according to claim 8, wherein for limiting relative displacement of the first and second structures in longitudinal and height directions of the spring element, the limiting arrangement comprises a rigid fastening to one of the first and second structures whose relative movement with respect to each other is to be attenuated, the limiting arrangement further comprising an arrangement of a sleeve and an aperture, wherein the diameter of the sleeve is smaller than the aperture, wherein the sleeve is allowed to move within the aperture such that the collision points between the sleeve and the aperture define the limits for the relative movement of the first and second structures and thereby limits the flexing or compressing of the spring element.

10. The spring structure according to claim 9, wherein the limiting arrangement comprises a limiting plate that comprises one or more first apertures for receiving a first fastening member for fastening the spring element rigidly to the first structure, the limiting plate further comprising one or more second apertures for receiving a second fastening member for fastening the spring element to the second structure, wherein the sleeve is disposed around the second fastening member, the sleeve having a smaller cross-section than the second aperture.

11. The spring structure according to claim 8, wherein the limiting arrangement comprises, for limiting transverse bending of the spring element, a fixed fastening to at least one of the first and second structures, and two limiting surfaces for limiting the movement of the first and second structures in a transverse direction.

12. A spring structure comprising:
a spring element having at least one loop portion for providing vibration isolation characteristics of the spring element, and fastening portions connected to the at least one loop portion, wherein a ratio of a longitudinal measure (a) of the loop portion to a transverse measure (b) of the spring element is between 7.5 and 500;
first and second structures movable relative to each other, the first and second structures being connected to the fastening portions of the spring element such that the spring element attenuates their relative movement;
a limiting assembly connecting the first and second structures together and operable to limit distortion of the spring element, the limiting assembly including:
a limiting plate connected to the spring element and the first structure;
a fastening member connecting the limiting plate to the first structure;
an aperture formed in one of the limiting plate and the first structure;
a sleeve movably disposed in the aperture and having a passage through which the fastening member extends, the movement of the sleeve in the aperture being limited by a constraint; and
wherein the constraint on the movement of the sleeve helps limit the distortion of the spring element.

13. The spring structure of claim 12, wherein the aperture is formed in the first structure, wherein the spring element is integrally joined to the first structure, and wherein the fastening structure extends through the limiting plate.

14. The spring structure of claim 13, wherein the spring element is also integrally joined to the second structure, and wherein the limiting plate is secured to the second structure, with an adjustment plate disposed in-between, a thickness of the adjustment plate determining a spacing between the first and second structures.

15. The spring structure of claim 13, wherein the spring element is secured to the second structure, with an adjustment plate disposed in-between, a thickness of the adjustment plate determining a spacing between the first and second structures.

16. The spring structure of claim 12, wherein the aperture is formed in the limiting plate, and wherein the spring element comprises:
a pair of loop portions integrally joined together at a middle section to form a continuous loop, the middle section having opposing sides disposed inward from opposing sides of both of the loop portions;
wherein the fastening portions are integrally joined to the opposing sides of the middle section, respectively, one of the fastening portions being connected to the first structure and the other one of the fastening portions being connected to the second structure; and
wherein the fastening member extends through an opening in one of the fastening portions.

17. The spring structure of claim 16, wherein the limiting plate is disposed between the spring element and the first and second structures;
wherein the fastening member is a first fastening member and the sleeve is a first sleeve;

wherein the limiting assembly further comprises a second fastening member extending through a second sleeve, which is movably disposed in the aperture;

wherein movement of both the first and second sleeves in the aperture is limited by constraints; and wherein the constraints on the movement of the first and second sleeves help limit the distortion of the spring element.

18. A base structure for supporting an object, the base structure comprising: a spring element comprising a pair of loop portions for providing vibration isolation characteristics of the spring element, the loop portions being integrally joined together at a middle section to form a continuous loop, wherein for each loop portion, a ratio of a longitudinal measure (a) of the loop portion to a transverse measure (b) of the spring element is between 7.5 and 500; and first and second support members disposed on opposing sides of the spring element and being movable relative to each other; and wherein the spring element and the first and second support members are formed as a unitary structure; and wherein each of the loop portions of the spring element has an end curve with an inner surface in the shape of an arc of an inner circle and an outer surface in the shape of an arc of an outer circle, wherein center points of the inner and outer circles are located at different points, thereby giving the end curve a varying height profile.

19. The base structure of claim 18, wherein the middle section has opposing sides disposed inward from opposing sides of both of the loop portions, the opposing sides of the middle section having fastening portions that are integrally joined to the first and second support members, respectively.

* * * * *